United States Patent [19]

Doida

[11] Patent Number: 5,440,493
[45] Date of Patent: Aug. 8, 1995

[54] LOT TRANSPORTING SYSTEM BETWEEN STATIONS HAVING DIERENT MANUFACTURING EQUIPMENTS

[75] Inventor: Teruo Doida, Yamaguchi, Japan
[73] Assignee: NEC Corporation, Tokyo, Japan
[21] Appl. No.: 224,741
[22] Filed: Apr. 7, 1994
[30] Foreign Application Priority Data
Apr. 15, 1993 [JP] Japan .................. 5-088256
[51] Int. Cl.⁶ ................ G06F 19/00; G05B 19/418
[52] U.S. Cl. ................................ 364/468; 364/401
[58] Field of Search .......... 364/468, 478, 401–403, 364/156, 474.11; 235/375, 385

[56] References Cited
U.S. PATENT DOCUMENTS

4,309,600 1/1982 Perry et al. .................. 364/468
4,580,207 4/1986 Arai et al. .................... 364/478 X
4,852,001 7/1989 Tsushima et al. ............ 364/468 X
5,202,836 4/1993 Iida .............................. 364/468
5,233,533 8/1993 Edstrom et al. .............. 364/468
5,282,139 1/1994 Kobayashi .................... 364/468

Primary Examiner—Joseph Ruggiero
Attorney, Agent, or Firm—Young & Thompson

[57] ABSTRACT

In a lot transporting system including a plurality of stations each having different types of manufacturing equipments, when the next manufacturing process to be performed upon a lot is determined, one of the stations having manufacturing equipments specific to the next manufacturing process is selected in accordance with predetermined ratios allocated to the stations. Then, the lot is transported to the selected station for the next manufacturing process.

3 Claims, 14 Drawing Sheets

PRODUCT TYPE : 256K SRAM

| PROCESS NO. | MANUFACTURING EQUIPMENT | STATION |
|---|---|---|
| 001 | CLEANING EQUIPMENT | A |
| 002 | DIFFUSION EQUIPMENT | B |
| 003 | RESIST COATING EQUIPMENT | C |
| 004 | SCALE-DOWN PROJECTION EXPOSURE EQUIPMENT | D |
| 005 | DEVELOPER EQUIPMENT | E |
| 006 | VISUAL INSPECTION EQUIPMENT | F |
| 007 | ETCHING EQUIPMENT | G |
| 008 | VISUAL INSPECTION EQUIPMENT | H |
| 009 | RESIST REMOVAL EQUIPMENT | I |
| --- | --- | --- |

Fig. 3 PRIOR ART

| LOT NO. | PRODUCT TYPE | CURRENT PROCESS NO. |
|---|---|---|
| 0 0 0 0 1 | 256K SRAM | 1 0 1 |
| 0 0 0 0 2 | 1 M DRAM | 2 3 1 |
| 0 0 0 0 3 | 256K SRAM | 1 0 2 |
| 0 0 0 0 4 | 1 M DRAM | 2 3 2 |
| 0 0 0 0 5 | 8BIT CPU | 0 2 0 |
| 0 0 0 0 6 | 256K SRAM | 0 0 7 |
| 0 0 0 0 7 | 8BIT CPU | 0 9 9 |
| 0 0 0 0 8 | 1 M DRAM | 3 2 0 |
| ⋮ | ⋮ | ⋮ |

PRODUCT TYPE: 256K SRAM

| PROCESS NO. | MANUFACTURING EQUIPMENT | STATION |
|---|---|---|
| 001 | CLEANING EQUIPMENT | A, B, E |
| 002 | DIFFUSION EQUIPMENT | A, B |
| 003 | RESIST COATING EQUIPMENT | A, B, C |
| 004 | SCALE-DOWN PROJECTION EXPOSURE EQUIPMENT | B, C, D |
| 005 | DEVELOPER EQUIPMENT | C, D |
| 006 | VISUAL INSPECTION EQUIPMENT | A, B, C, D |
| 007 | ETCHING EQUIPMENT | D, E |
| 008 | VISUAL INSPECTION EQUIPMENT | A, B, C, D |
| 009 | RESIST REMOVAL EQUIPMENT | C, D |
| --- | --- | --- |

| PRODUCT TYPE | PROCESS NO. | RATIO (%) | | | | |
|---|---|---|---|---|---|---|
| | | A | B | C | D | E |
| 256K SRAM | 006 | 10 | 20 | 30 | 40 | 0 |
| 256K SRAM | 008 | 10 | 0 | 0 | 0 | 10 |
| 256K SRAM | 030 | 0 | 10 | 0 | 0 | 0 |
| 1M DRAM | 006 | 0 | 0 | 10 | 30 | 0 |
| 1M DRAM | 008 | 30 | 20 | 0 | 0 | 0 |
| 1M DRAM | 030 | 0 | 0 | 0 | 0 | 10 |
| 8BIT CPU | 006 | 0 | 0 | 20 | 10 | 0 |
| 8BIT CPU | 008 | 0 | 10 | 30 | 0 | 0 |
| 8BIT CPU | 030 | 0 | 0 | 0 | 10 | 40 |
| ---- | ---- | ---- | ---- | ---- | ---- | ---- |

Fig. 8

PRODUCT TYPE : 256K SRAM
PROCESS NO. 006

| RANDOM NUMBER | STATION |
|---|---|
| 0 0 | A |
| 0 1 | A |
| ⋮ | ⋮ |
| 0 9 | A |
| 1 0 | B |
| 1 1 | B |
| ⋮ | ⋮ |
| 2 9 | B |
| 3 0 | C |
| 3 1 | C |
| ⋮ | ⋮ |
| 5 9 | C |
| 6 0 | D |
| 6 1 | D |
| ⋮ | ⋮ |
| 9 9 | D |

Fig. 9

| LOT NO. | PRODUCT TYPE | CURRENT PROCESS NO. | CURRENT STATION | NEXT STATION |
|---|---|---|---|---|
| 00001 | 256K SRAM | 101 | A | B |
| 00002 | 1 M DRAM | 231 | B | — |
| 00003 | 256K SRAM | 102 | C | E |
| 00004 | 1 M DRAM | 232 | D | — |
| 00005 | 8BIT CPU | 020 | E | B |
| 00006 | 256K SRAM | 007 | A | — |
| 00007 | 8BIT CPU | 099 | B | C |
| 00008 | 1 M DRAM | 320 | C | — |
| ---- | ---- | ---- | ---- | ---- |

VISUAL INSPECTION EQUIPMENT PRODUCT TYPE : 256K SRAM

PROCESS NO. 006

| STATION | MACHINE STATE | | | | | | | | | TOTAL |
|---|---|---|---|---|---|---|---|---|---|---|
| A | 001 | ◯ | 002 | ◯ | 003 | | 004 | × | | 2 |
| B | 005 | × | 006 | × | | | | | | 0 |
| C | 007 | ◯ | 008 | ◯ | 009 | ◯ | | | | 3 |
| D | 010 | ◯ | | | | | | | | 1 |
| E | 011 | ◯ | 012 | × | | | | | | 1 |

◯ --- OPERABLE
× --- NONOPERABLE

*Fig. 13*

VISUAL INSPECTION EQUIPMENT
MACHINE 001

| PRODUCT TYPE | PROCESS NO. |
|---|---|
| 256K SRAM | 006 |
| 1M DRAM | 006 |
| 8BIT CPU | 006 |

Fig. 14

PRODUCT TYPE : 256K SRAM
PROCESS NO. 006

| RANDOM NUMBER | STATION |
|---|---|
| 0 0 | A |
| 0 1 | A |
| ⋮ | ⋮ |
| 2 8 | A |
| 2 9 | C |
| 3 0 | C |
| ⋮ | ⋮ |
| 7 0 | C |
| 7 1 | D |
| 7 2 | D |
| ⋮ | ⋮ |
| 8 5 | D |
| 8 6 | E |
| 8 7 | E |
| ⋮ | ⋮ |
| 9 9 | E |

LOT TRANSPORTING SYSTEM BETWEEN STATIONS HAVING DIERENT MANUFACTURING EQUIPMENTS

BACKGROUND OF THE INVENTION

1. Field of the Invention

The present invention relates to a lot transporting system between a plurality of stations, i.e., areas, each including a plurality of manufacturing equipments.

2. Description of the Related Art

For example, in a semiconductor manufacturing factory, various kinds of semiconductors are manufactured in parallel, thereby necessitating various manufacturing equipments each specific to one manufacturing step (process). For example, there are approximately 100 to 700 manufacturing processes in one factory. Also, the same lot is often repeatedly processed by the same manufacturing equipment.

In a prior art lot transporting system, a plurality of stations each having a plurality of the same kinds of manufacturing equipments are located at different sites, which will be later explained in detail. Therefore, in this case, each station can usually be defined by its corresponding manufacturing process. As a result, after a manufacturing process performed upon a lot is completed, the next manufacturing process is determined, so that a cart or the like moves this lot to a station specific to the next manufacturing process.

However, in recent years, more manufacturing equipments are installed at the stations without increasing the area thereof, to thereby enhance the manufacturing efficiency. As a result, different kinds of manufacturing equipments are installed at one station, in other words, the same kind of manufacturing equipments are dispersed at a plurality of stations. Further, very highly integrated semiconductors have to be processed by only specialized manufacturing equipments.

Therefore, it is complex to transport lots between the stations, and as a result, the transportation of lots between the stations is actually carried out by hand, to thereby deteriorate the efficiency of transportation of lots, thus increasing the manufacturing cost.

SUMMARY OF THE INVENTION

It is an object of the present invention to improve the efficiency of transportion of lots in a lot transporting system having a plurality of stations each including different types of manufacturing equipments.

According to the present invention, in a lot transporting system including a plurality of stations each having different types of manufacturing equipments when the next manufacturing process to be performed upon a lot is determined, one of the stations having manufacturing equipments specific to the next manufacturing process is selected in accordance with predetermined ratios allocated to the stations. Then, the lot is transported to the selected station for the next manufacturing process. As a result, the transportation of lots between the stations is smoothly carried out.

BRIEF DESCRIPTION OF THE DRAWINGS

The present invention will be more clearly understood from the description as set forth below, as compared with the prior art, with reference to the accompanying drawings, wherein.

DESCRIPTION OF THE PREFERRED EMBODIMENT

Before the description of the preferred embodiment, a prior art lot transporting system will be explained with reference to FIGS. 1, 2 and 3.

Figure 1:
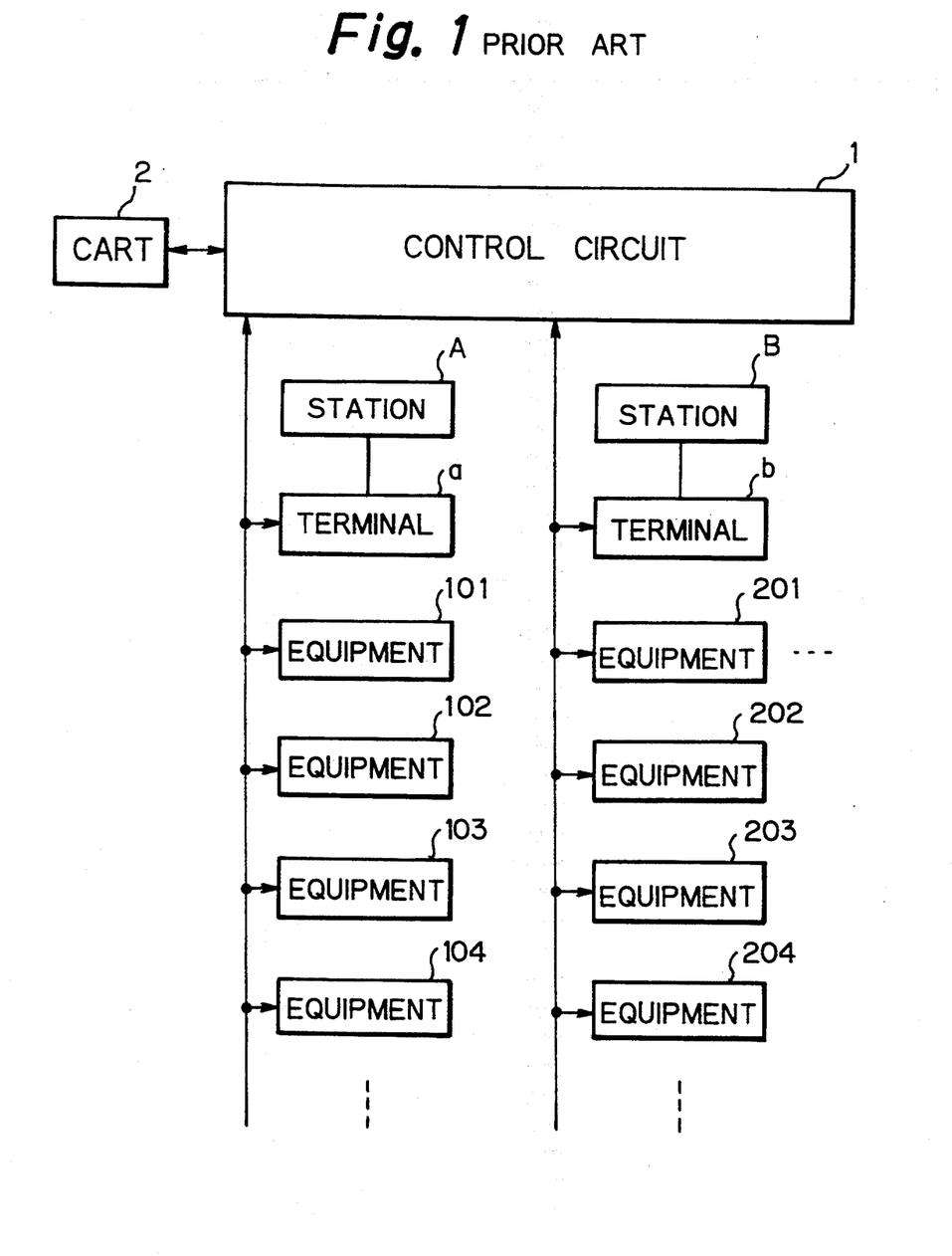
FIG. 1 is a block diagram illustrating a prior art lot transporting system.

In FIG. 1, which illustrates a prior art lot transporting system for a semiconductor production line, a plurality of stations (areas) A, B, ... associated with their terminals are located at different sites. In this case, each of the stations A, B, ... includes the same kinds of manufacturing equipments. For example, the station A includes a plurality of cleaning equipments 101, 102, 103, 104, ..., and the station B includes a plurality of diffusion equipments 201, 202, 203, 204, .... The stations A, B, ... associated with the terminals a, b, ..., and the equipments 101, 102, ..., 201, 202, ... are connected to a control circuit 1 which may include a microcomputer incorporating a read-only memory (ROM), and a random access memory (RAM). The control circuit 1 controls a cart 2 to transport lots among the stations. Thus, in the lot transporting system of FIG. 1, each of the stations A, B, ... is specific to one manufacturing process.

Figure 2:
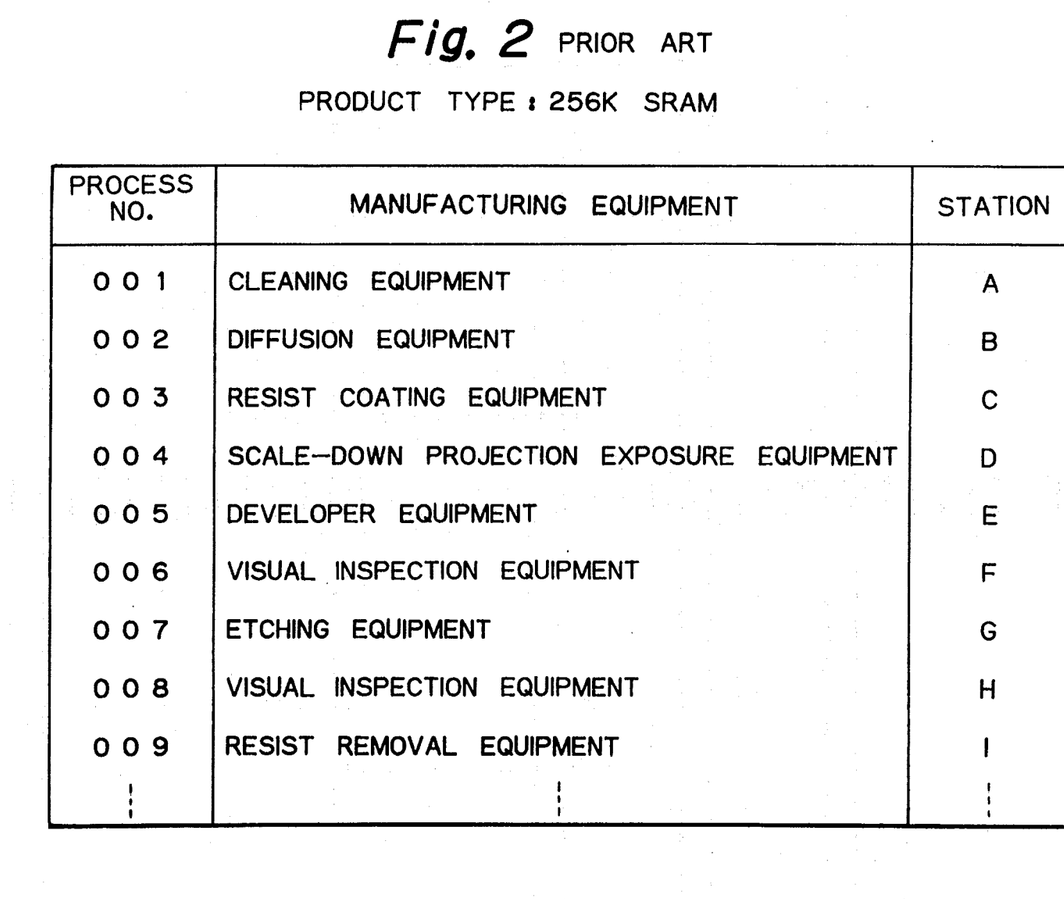
FIG. 2 is a table showing a relationship between the manufacturing processes and stations of a product type used in the system of FIG. 1.

In FIG. 2, which shows manufacturing processes of a product type such as 256 K static random access memory (SRAM), when a process to be performed upon a lot is determined, a station for processing this lot is unambiguously determined, since the same kinds of manufacturing equipments are located at one station. For example, a manufacturing process No. 1 is carried out at one of the cleaning equipments of the station A.

Figure 3:
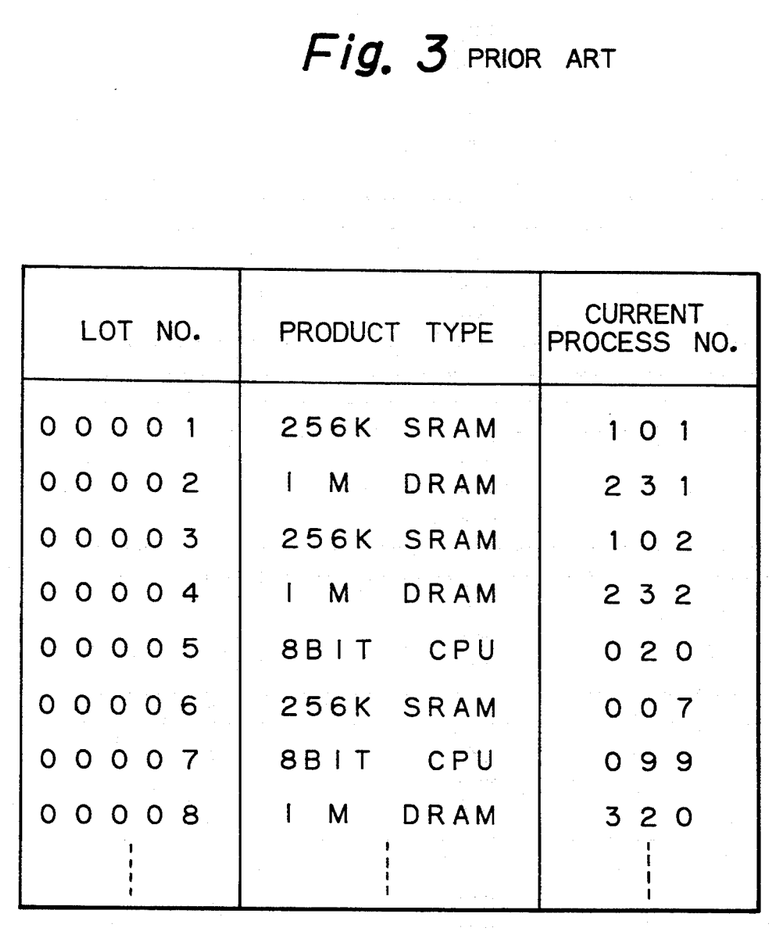
FIG. 3 is a table showing a production control state stored in the control circuit of FIG. 1.

In FIG. 3, which shows an example table of lots currently being processed, lots having Nos. 00001, 00002, ... are currently being processed in the stations A, B, ... within the factory. If a process performed upon a lot such as No. 1 is completed, the corresponding manufacturing equipment sends completion information to the control circuit 1, so that the control circuit 1 counts up the current process number by 1. As a result, the control circuit 1 orders the cart 2 to move the lot from the current station to the next station defined by the next process number.

Figure 4:
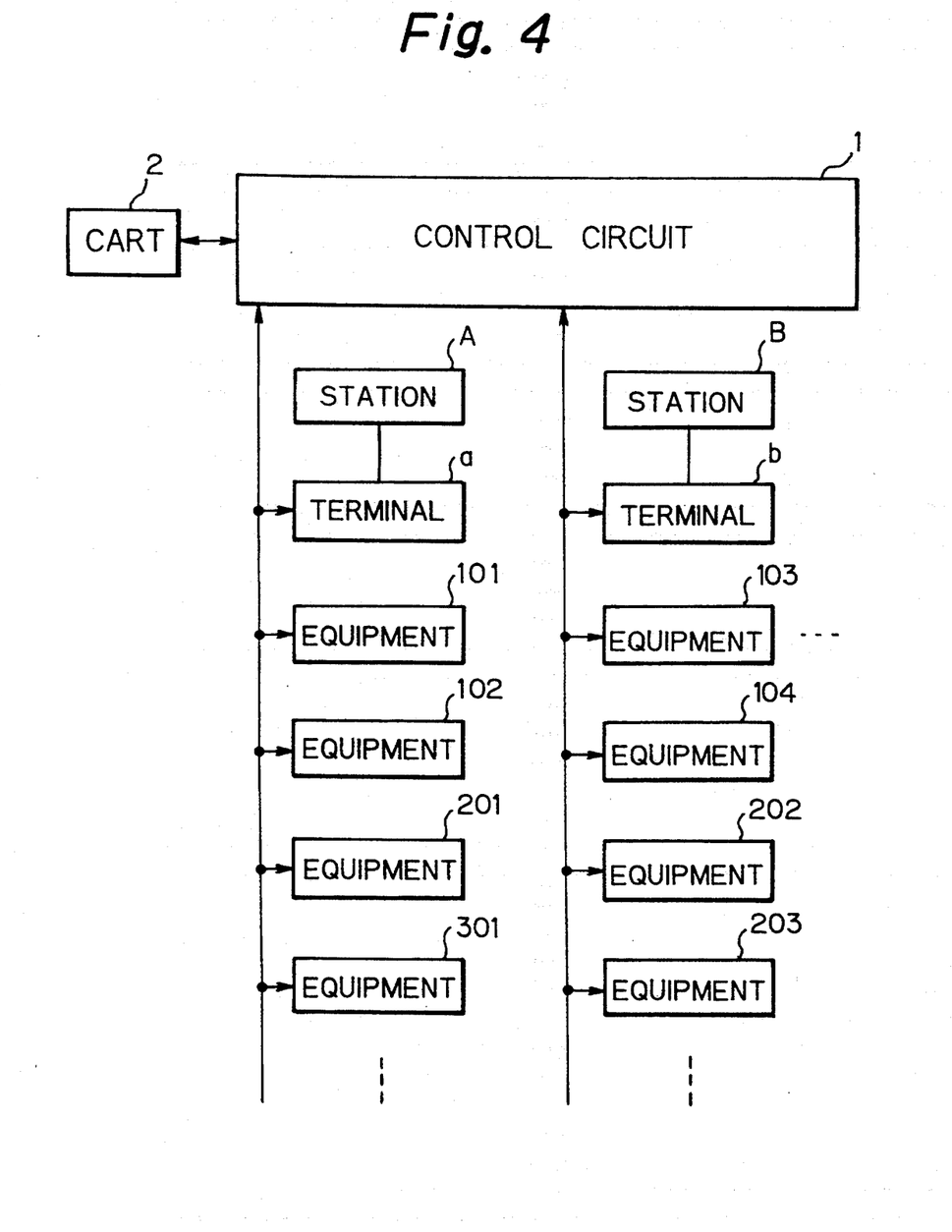
FIG. 4 is a block circuit diagram illustrating an embodiment of the lot transporting system according to the present invention.

In FIG. 4, which illustrates an embodiment of the lot transporting system according to the present invention, each of the stations A, B, ... includes different kinds of manufacturing equipments. For example, the station A includes cleaning equipments 101 and 102, a diffusion equipment 201, a resist coating equipment 301, ..., while the station B includes cleaning equipments 103 and 104, diffusion equipments 202 and 203, .... In other words, the cleaning equipments 101, 102, 103, ... are dispersed into some of the stations, and the diffusion equipments 201, 202, 203, ... are also dispersed into some of the stations.

Figure 5:
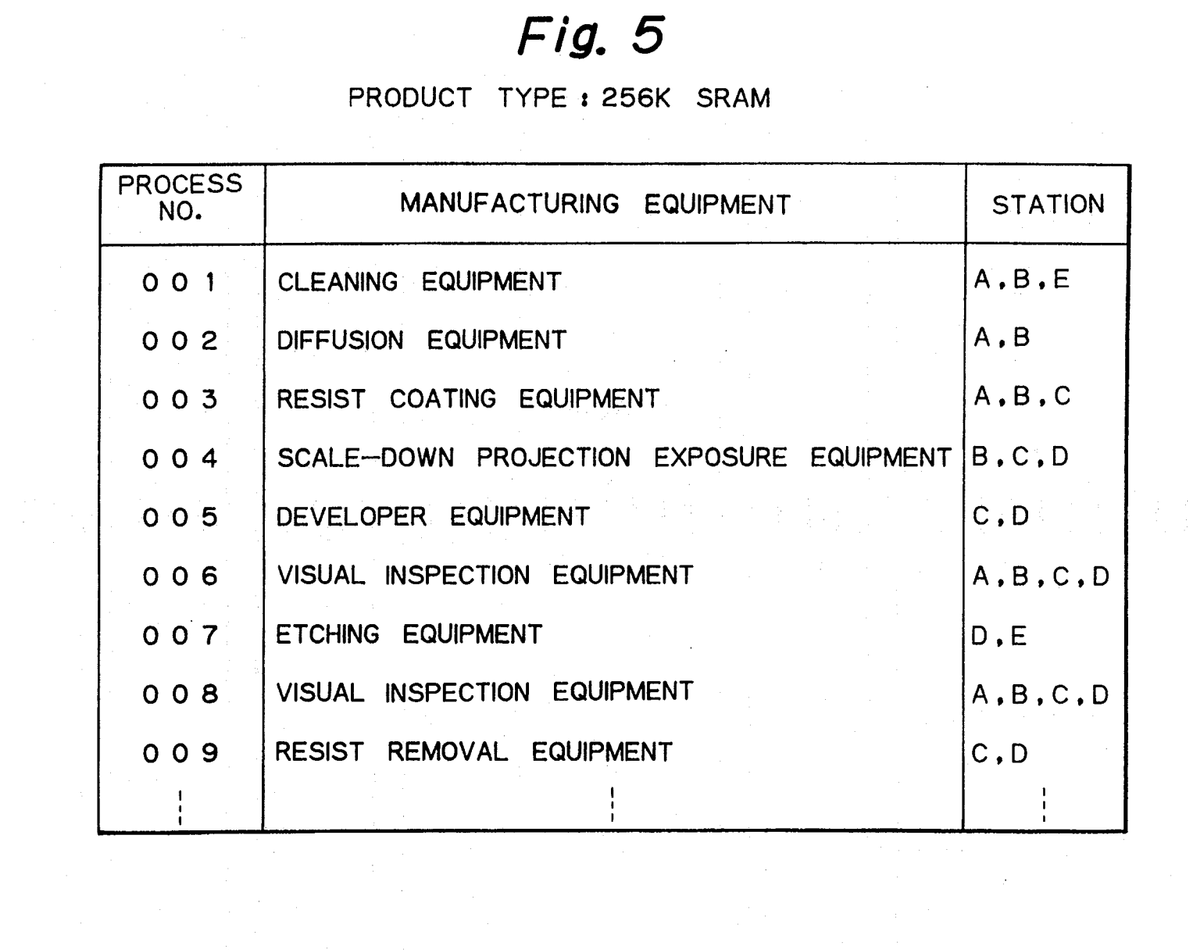
FIG. 5 is a table showing a relationship between the manufacturing processes and stations of a product type used in the system of FIG. 4.

On the other hand, as shown in FIG. 5, which shows manufacturing processes of a product type such as 256 K SRAM, one process can be carried out at a plurality of stations. For example, the process No. 006 of the product type 256 K SRAM can be carried out by the visual inspection equipments of the stations A, B, C and D.

Figure 6:
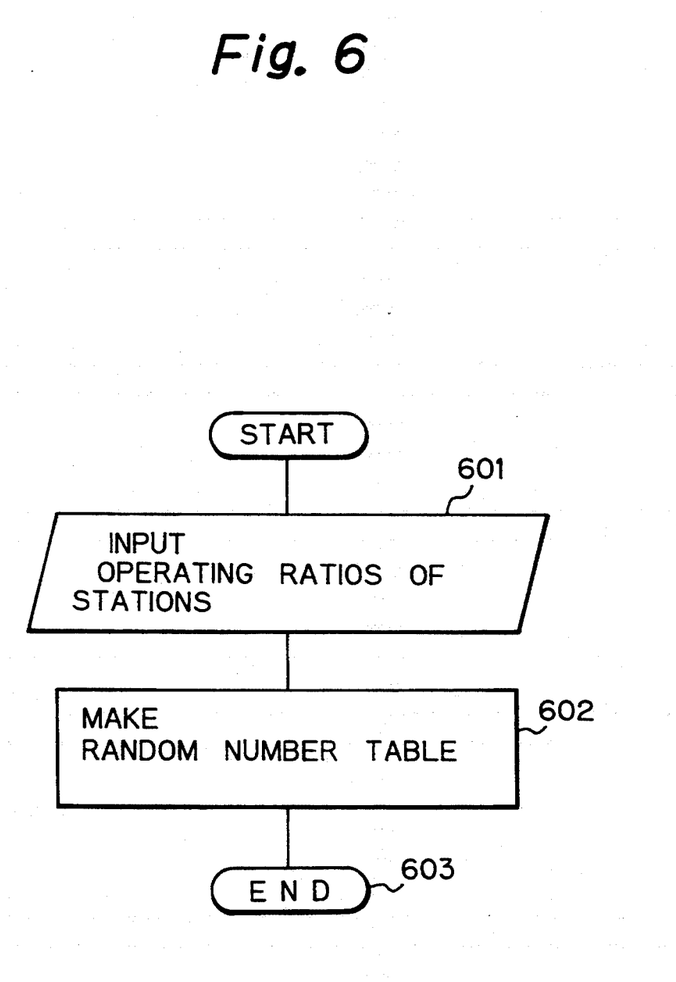
FIG. 6 is a flowchart showing the operation of the control circuit of FIG. 3.
Figure 7:
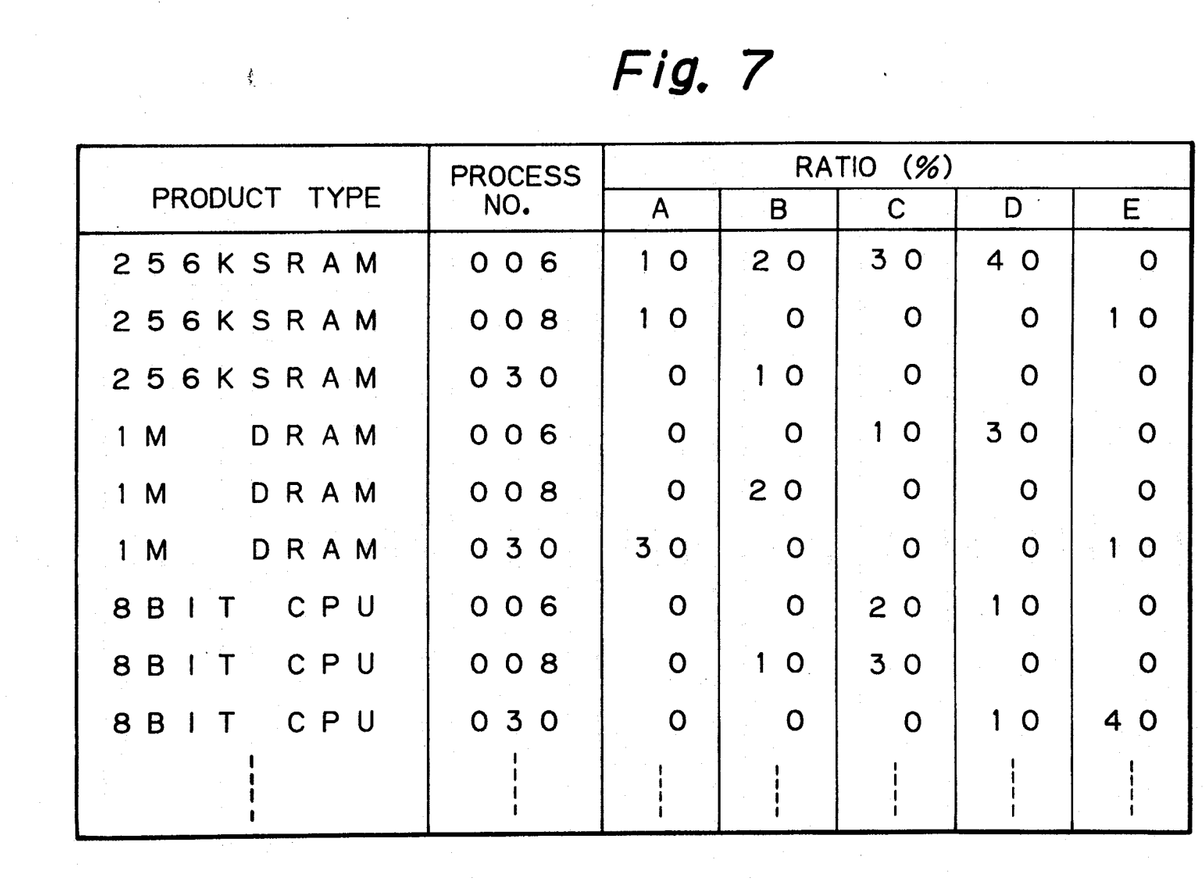
FIG. 7 is a table showing a relationship between the processes and the ratios of stations defined by the routine of FIG. 6.
Figure 8:
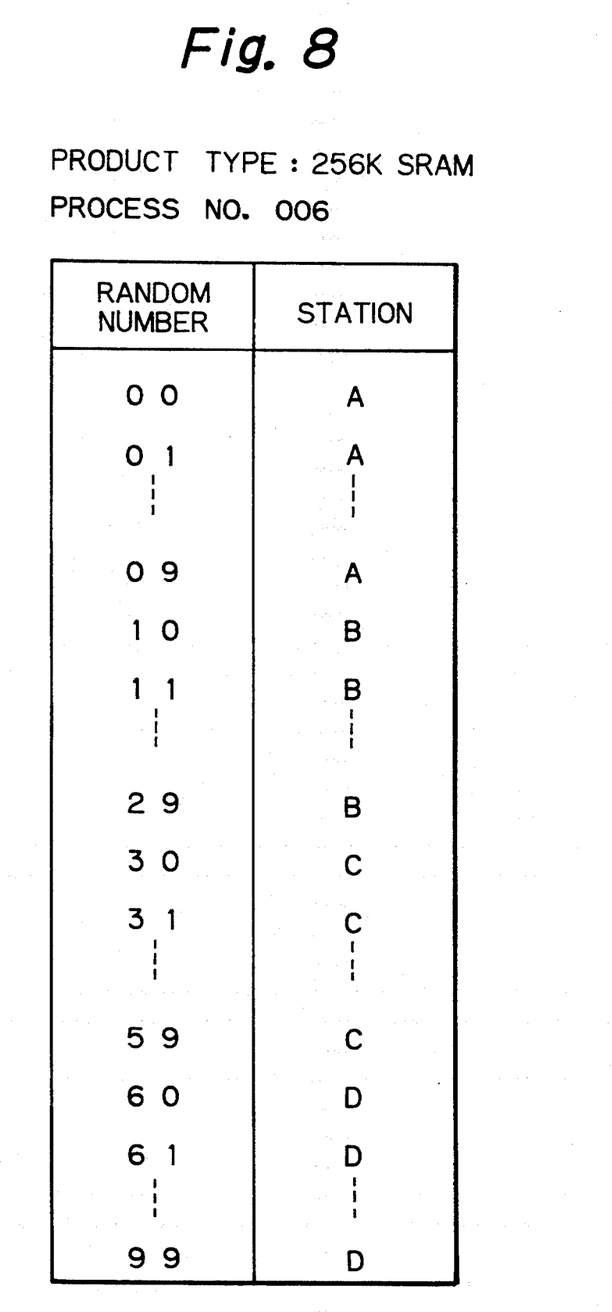
FIG. 8 is a table showing a relationship between random numbers and stations for one manufacturing process of a product type stored in the control circuit of FIG. 4.

In the present invention, ratios are predetermined for each process of the various product types by using a routine as shown in FIG. 6 which is carried out by the control circuit 1. At step 601, ratios are input for each process of the product types as shown in FIG. 7. For example, the process No. 006 of 256 K SRAM which is, in this case, a visual inspection process is carried out at the stations A, B, C and D at a ratio of 10:20:30:40. Next, at step 602, random number tables for all of the processes of the product types are made. For example, a random number table for the process No. 006 of 256 K SRAM is shown in FIG. 8. This random number table is made as follows:

$Amin = 0$
$Amax = a*100/(a+b+c+d+e) - 1$
$Bmin = Amax + 1$
$Bmax = (a+b)*100/(a+b+c+d+e) - 1$
$Cmin = Bmax + 1$
$Cmax = (a+b+c)*100/(a+b+c+d+e) - 1$
$Dmin = Cmax + 1$
$Dmax = (a+b+c+d)*100/(a+b+c+d+e) - 1$
$Emin = Dmax + 1$
$Emax = 99$ Note that the decimal is rounded off. For example, in the product type 256 K SRAM, process No. 006 as shown in FIG. 7, a=10, b=20, c=30, d=40, and e=0. Then, $Amin = 0$
$Amax = 9$
$Bmin = 10$
$Bmax = 29$
$Cmin = 30$
$Cmax = 59$
$Dmin = 60$
$Dmax = 99$
$Emin = 100$
$Emax = 99$ Note that, for the station E having a ratio of 0, $Emin = Emax + 1$. In this case, no random number is allocated to the station E. Then, the routine of FIG. 6 is completed by step 603.

Next, the operation of the control circuit 1 of FIG. 4 after a process upon a lot is completed will be explained with reference to FIG. 10. Assuming that a table of lots currently processed in the factory is stored in the RAM of the control circuit 1.

Figure 9:
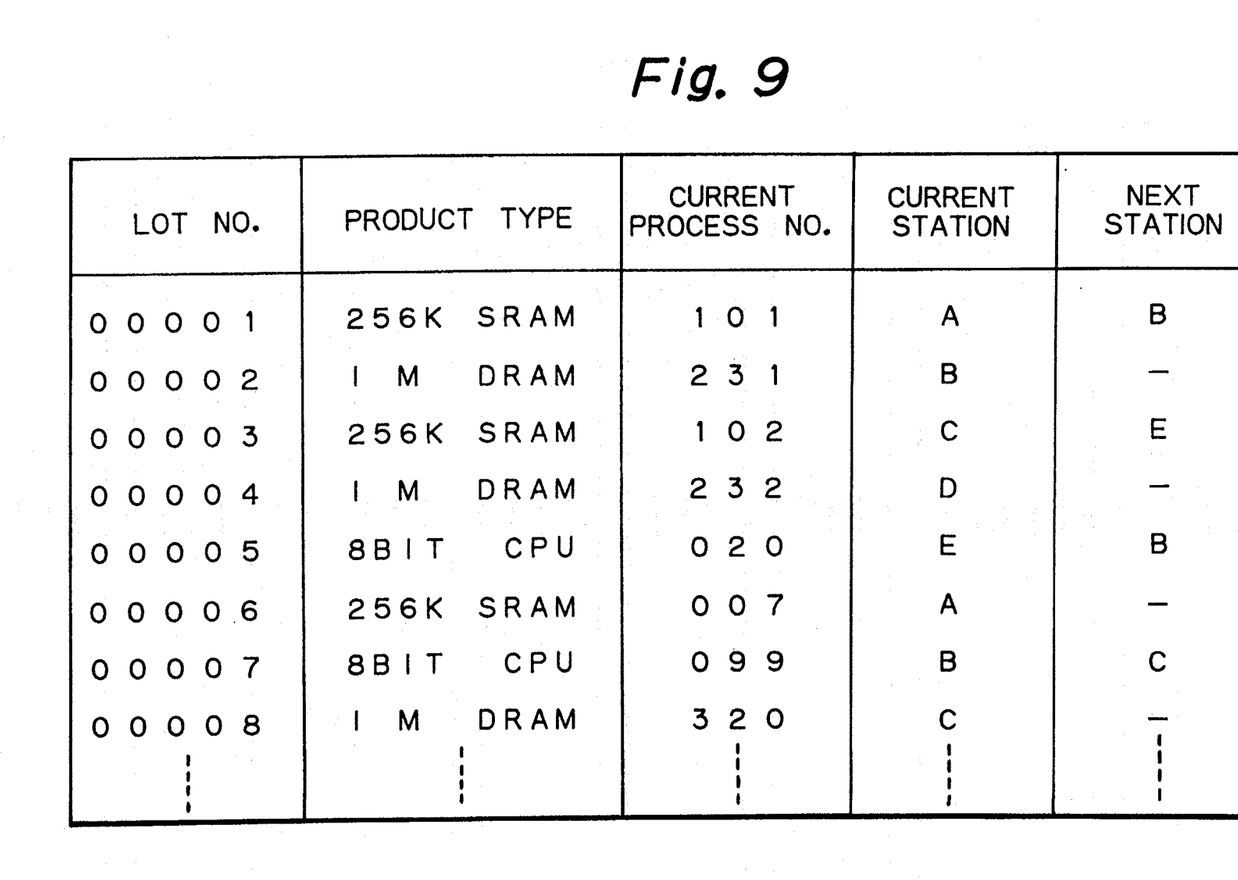
FIG. 9 is a table showing a production control state stored in the control circuit of FIG. 4.
Figure 10:
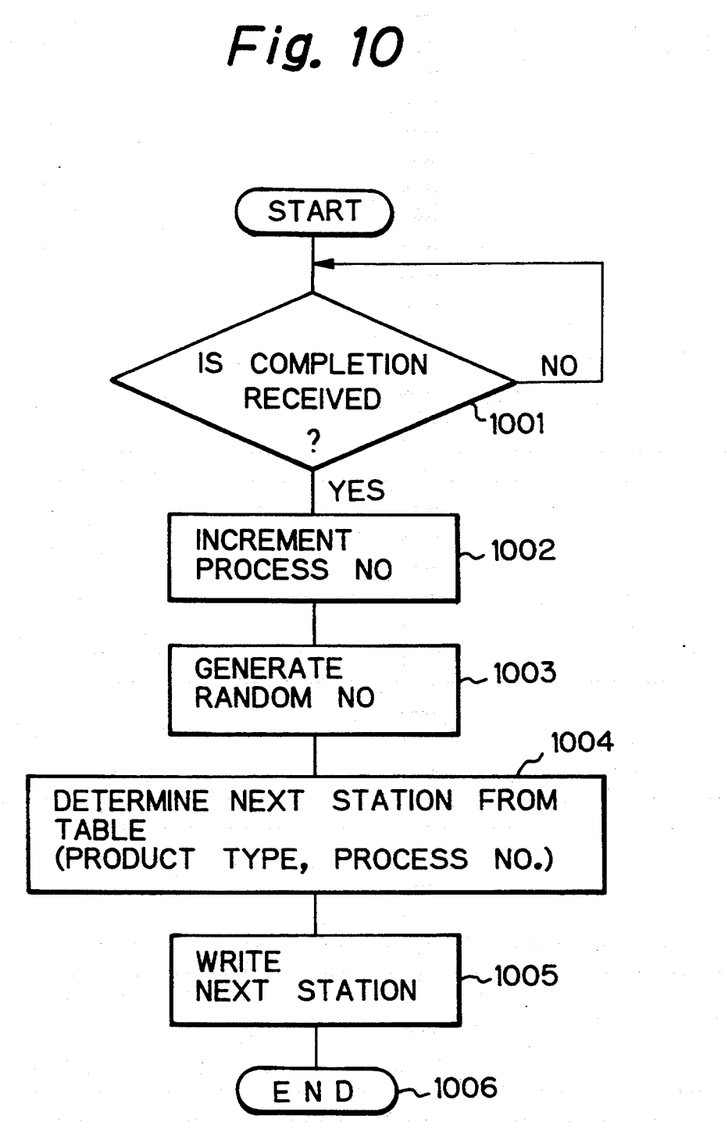
FIGS. 10 and 11 are flowcharts showing the operation of the control circuit of FIG. 4.

Referring to FIG. 10, at step 1001, a completion signal indicating that a process upon a lot is completed is being waited for. Only when such a completion signal associated with a lot number is received by the control circuit 1, does the control proceed to step 1002 which counts up the process number by 1. Then, at step 1003, a two-digit random number is generated. Next, at step 1004, a table designated by the product type and the process number is searched, and the next station is retrieved from this table using the random number. Then, the next station is written into the table of FIG. 9. Thus, the routine of FIG. 10 is completed by step 1006.

Figure 11:
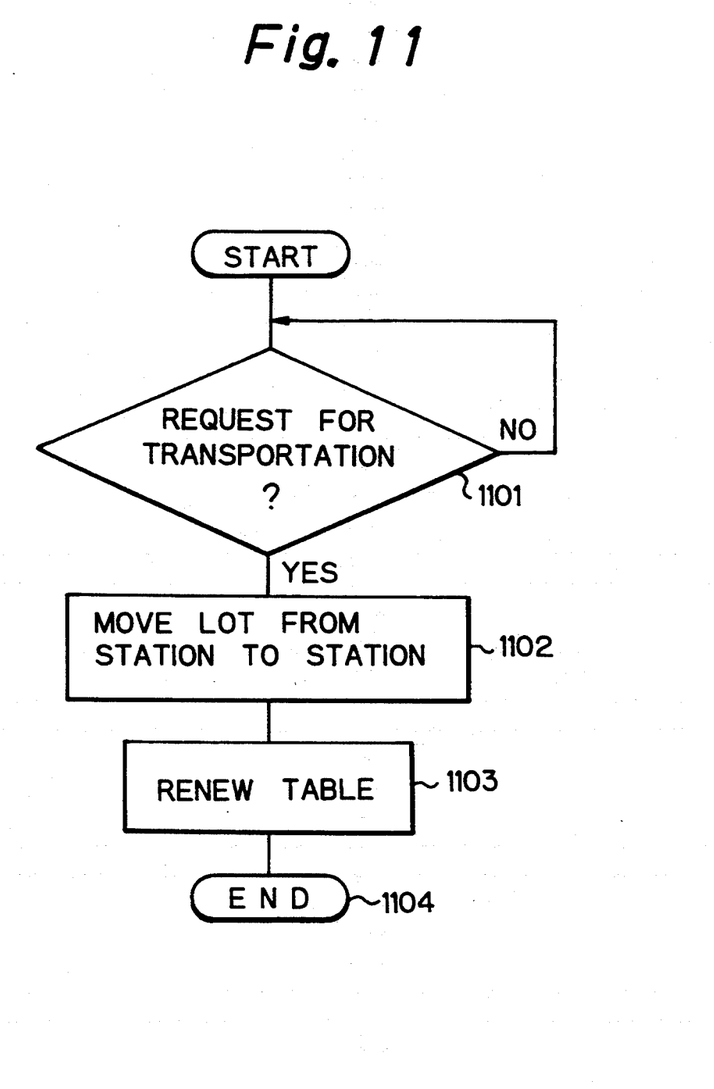

Next, the operation of the control circuit 1 of FIG. 4 after a request for transportation is received will be explained with reference to FIG. 11. At step 1101, a request for transportation of a lot from a station is being waited for. Only when such a request for transportation from a station is received, does the control proceed to step 1102 which retrieves the table as shown in FIG. 9 to search the next station. Then, the control circuit 1 controls the cart 2 to move the lot from the current station to the next station. Then, at step 1103, the table of FIG. 9 is renewed, so that the content of the current station of the corresponding lot is replaced by the next station, and the content of the next station is erased. Then, the routine of FIG. 11 is completed by step 1104.

Thus, even when the same kinds of manufacturing equipments are located at different stations, lots can be automatically transported from station to station. If a zero ratio is allocated to special stations, the corresponding lots can be processed at the other stations.

Figure 12:
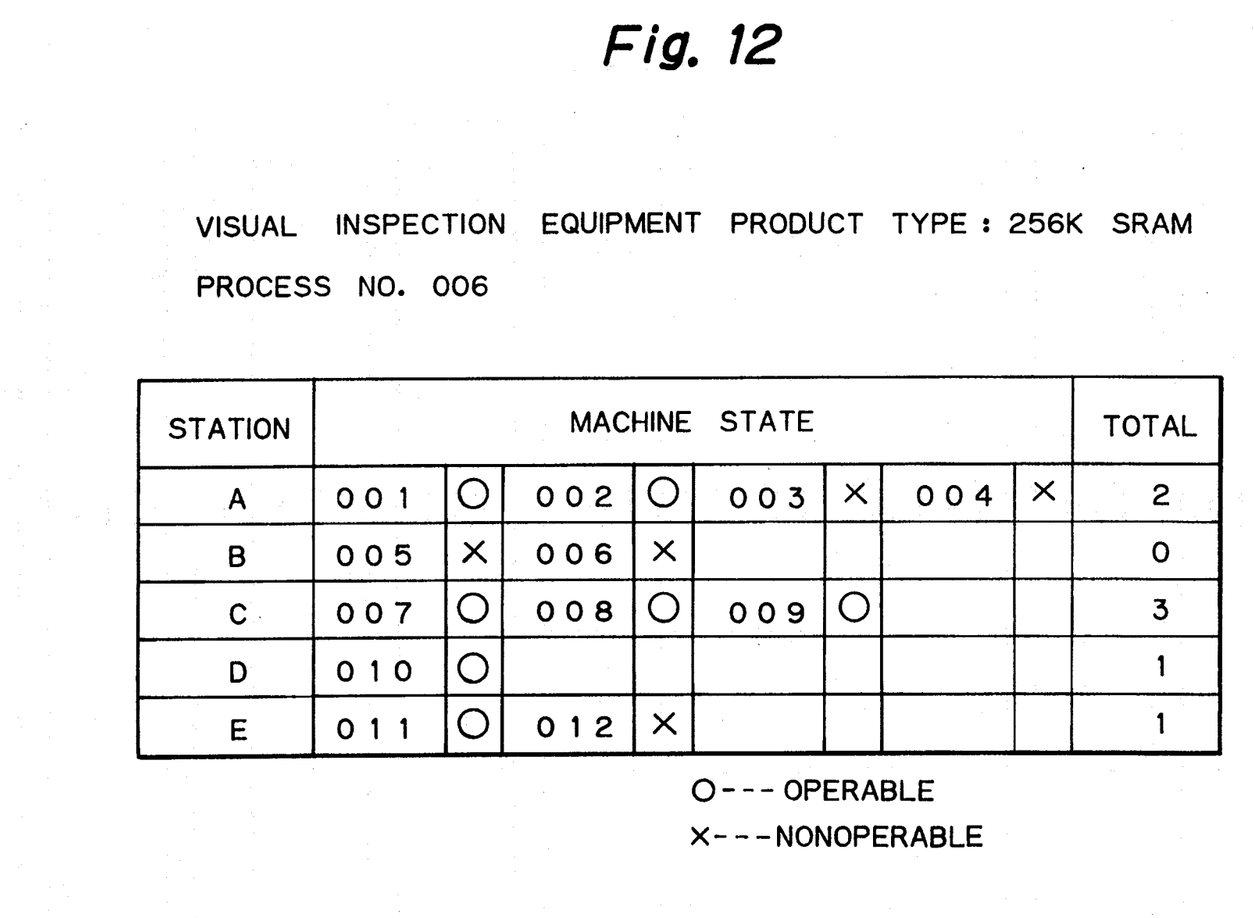
FIG. 12 is a table showing a relationship between the manufacturing process and operable machines for a product type stored in the control circuit of FIG. 4.
Figure 13:
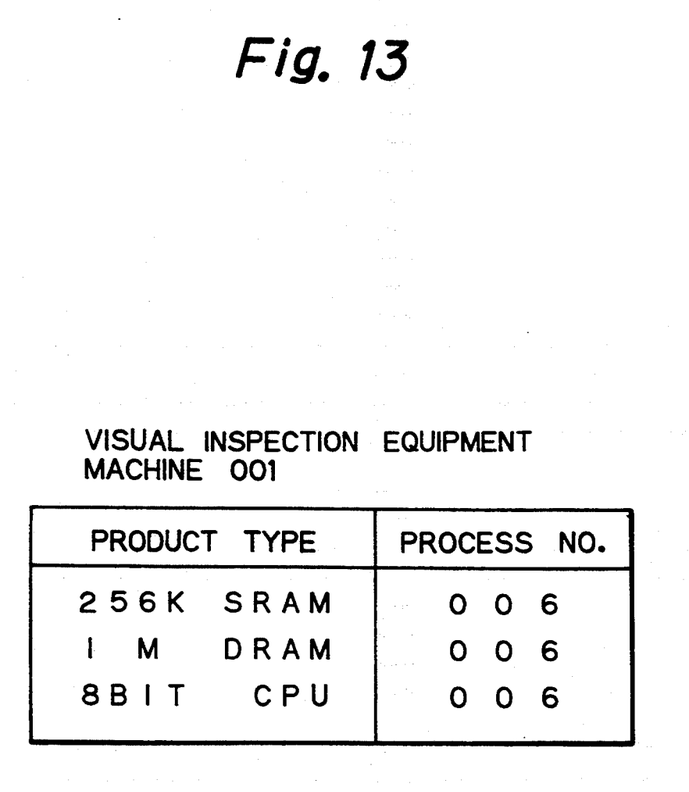
FIGS. 13 is a table showing a manufacturing process specific to a manufacturing equipment, stored in the control circuit of FIG. 4.
Figure 14:
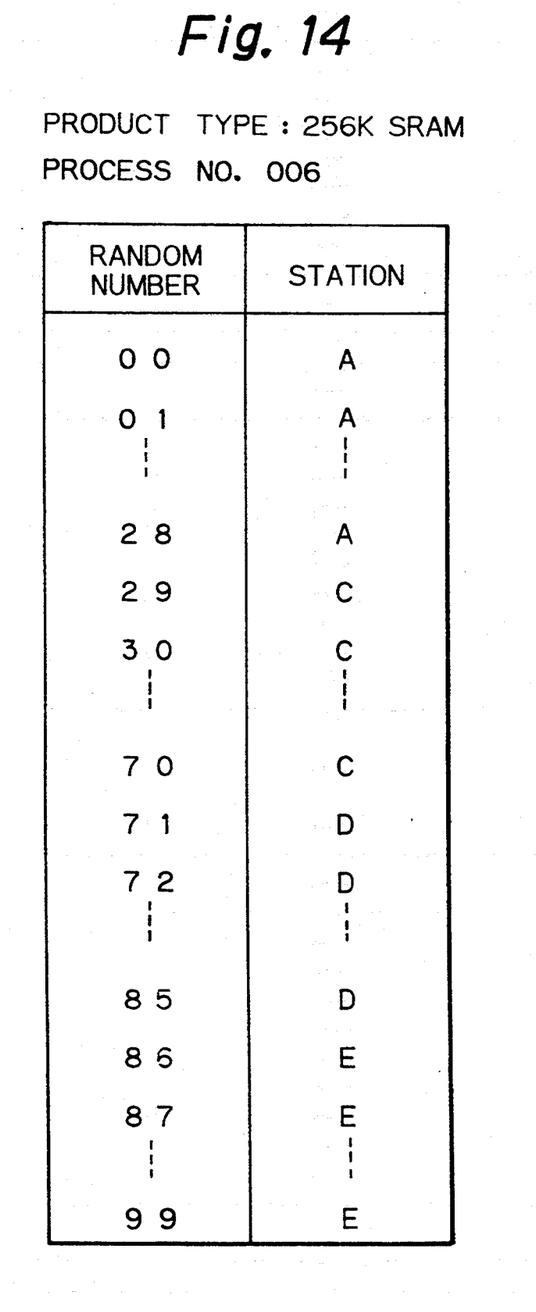
FIG. 14 is a table showing a relationship between random numbers and stations for one manufacturing process of a product type stored in the control circuit of FIG. 4.

A modification of the process for preparing random number tables will be explained next. Assuming that a process of a product type is carried out by special machines, for example, there are twelve visual inspection equipments having machine numbers 001 through 012 specifically for process No. 006 of 256 K SRAM, in this case, as illustrated in FIG. 12, the machines 001 to 004 are located at the station A; the machines 005 and 006 are located at the station B; the machines 007, 008 and 009 are located at the station C; the machine 010 is located at the station D; and the machines 011 and 012 are located at the station E. In this example, each of the machines is used specifically for some of the processes of some of the product types. For example, as shown in FIG. 13, the machine 001 is used specifically for process No. 006 of 256 K SRAM, process No. 006 of 1 M DRAM, and process No. 006 of 8 BIT CPU. Note that other visual inspection machines are also present. As a result, as shown in FIG. 12, the process No. 006 of 256 K SRAM can be carried out at 2 machines of the station A, 0 machines of the station B, 3 machines of the station C, 1 machine of the station D, and 1 machine of the station E. Therefore, in this case, a random number table is calculated as shown in FIG. 14.

If all of the machines of one station malfunction, then a zero ratio is allocated to this station, so the transportation of lots between the stations can be smoothly carried out.

As explained hereinbefore, in a plurality of stations where different type manufacturing equipments are located, since the transportation of lots between the stations is carried out in accordance with a predetermined ratio allocated to the stations, the transportation of lots can be smoothly carried out.

I claim:

1. A lot transporting system comprising:

a plurality of stations at different sites, each station having a plurality of manufacturing equipments each specific to one manufacturing process;

means for storing a first table showing a relationship among a lot number, a product type, a process number, and a station to be processed;

means for storing a second table showing a relationship between random numbers and said stations with respect to said product type and said process number means for incrementing the process number in said first table when one process for a lot is completed;

means for generating a random number;

means for selecting one of said stations to which the random number is allocated in the second table with respect to a product type of the lot and the incremented process number; and means for moving the lot to a selected station by said selecting means.

2. A lot transporting system comprising:

a plurality of stations at different sites, each station having a plurality of manufacturing equipments each specific to one manufacturing process;

means for storing a first table showing a relationship among a lot number, a product type, a process number, and a station to be processed;

means for storing a second table showing a relationship between random numbers and said stations with respect to said product type and said process number means for incrementing the process number in said first table when one process of a lot is completed;

means for generating a random number;

means for selecting one of said stations to which the random number is allocated in the second table with respect to a product type of the lot and the incremented process number;

means for renewing the station to be processed in the first table;

means for moving the lot to the station to be processed in the first table when receiving a request for transportation of a lot.

3. A lot transporting system comprising:

a plurality of stations at different sites, each station having a plurality of manufacturing equipments, each specific to one manufacturing process, at least one of said stations having different types of manufacturing equipments;

means for determining a next manufacturing process to be performed upon a lot;

means for selecting one of said stations having manufacturing equipments specific to the next manufacturing process in accordance with predetermined ratios of processing said lot allocated to said stations; and means for transporting the lot to a station selected by said selecting means;

wherein a plurality of random numbers are allocated to each of said stations, said selecting means comprising:

means for generating a random number; and means for selecting one of said stations to which the random number is allocated.

* * * * *

UNITED STATES PATENT AND TRADEMARK OFFICE
CERTIFICATE OF CORRECTION

PATENT NO. : 5,440,493
DATED : August 8, 1995
INVENTOR(S) : Teruo DOIDA

It is certified that error appears in the above—identified patent and that said Letters Patent is hereby corrected as shown below:

On the title page, item [54] and col. 1, line 2, the title of the invention, change "DIERENT" to --DIFFERENT--.

Signed and Sealed this

Seventeenth Day of October, 1995

Attest:

BRUCE LEHMAN

Attesting Officer

Commissioner of Patents and Trademarks